United States Patent [19]
Audoux

[11] 4,187,808
[45] Feb. 12, 1980

[54] ENGINE HAVING A VARIABLE COMPRESSION RATIO

[75] Inventor: Guy Audoux, Adainville par Conde sur Vesgres, France

[73] Assignees: Automobiles Peugeot; Societe Anonyme Automobiles Citroen, both of Paris, France

[21] Appl. No.: 923,106

[22] Filed: Jul. 10, 1978

[30] Foreign Application Priority Data

Jul. 11, 1977 [FR] France ................................ 77 21259

[51] Int. Cl.$^2$ .............................................. F02B 75/04
[52] U.S. Cl. ............................. 123/48 AA; 123/47 R; 123/78 AA
[58] Field of Search ............. 123/48 R, 48 A, 48 AA, 123/78 R, 78 A, 78 AA, 47 R, 47 AA

[56] References Cited

U.S. PATENT DOCUMENTS

| | | | |
|---|---|---|---|
| 1,167,023 | 1/1916 | Schmidt | 123/78 AA |
| 1,612,493 | 12/1926 | Cutler | 123/78 AA |
| 1,720,368 | 7/1929 | McCoy | 123/78 A |
| 2,467,568 | 4/1949 | Rosaen | 123/48 AA |
| 4,013,057 | 3/1977 | Guenther | 123/193 P |

FOREIGN PATENT DOCUMENTS 407779  3/1910 France ................................ 123/78 AA

*Primary Examiner*—Ira S. Lazarus
*Assistant Examiner*—Craig R. Feinberg
*Attorney, Agent, or Firm*—Burns, Doane, Swecker & Mathis

[57] ABSTRACT

The engine comprises, for each of its cylinders, an auxiliary piston provided with a piston rod. The piston is movable in a cavity which is formed in the cylinder head and opens into the combustion chamber. The cavity defines with the auxiliary piston an annular chamber around the piston rod. A liquid under pressure is supplied to the annular chamber by way of a check-valve. The rod has an axial bore in which is slidable a slide valve member whose position is under the control of a parameter representing the conditions of operation of the engine. The slide valve member cooperates with at least one escape port formed across the hollow rod to constitute a liquid discharge path for the annular chamber.

5 Claims, 3 Drawing Figures

ENGINE HAVING A VARIABLE COMPRESSION RATIO

The present invention relates to means for varying, in operation, the volumetric compression ratio of an internal combustion engine.

It is known that the thermodynamic efficiency of petrol or gasoline engines increases with increase in their compression ratio. For an engine operating under full load, the value of this compression ratio is limited by the octane index of the fuels employed and any increase beyond this limit ratio results in serious operational disorders of the engine and in particular knocking.

On the other hand, at partial load, a much higher compression ratio is allowable, which markedly improves the thermodynamic efficiency.

This is why it has been proposed to arrange explosion engines in such manner as to be able to vary their compression ratio in the course of engine operation.

In a first design, the piston of the engine comprises an outer part which is capable, under the effect of hydraulic means, of axially moving a limited amount with respect to an inner part connected to the piston connecting rod. Unfortunately, fluid under pressure must be supplied through the crankshaft and the connecting rod and leads to serious complications.

In another design, the cylinder head of the engine includes in the region of each cylinder a secondary piston, the displacement of which varies the volume of the combustion chamber. Now, owing to the effort required to maintain this secondary piston in position at the moment of the explosion, the known devices are particularly complex and expensive.

An object of the invention is to provide a device of the last-mentioned type which is particularly simple and requires no special source of energy.

According to the invention, there is provided an explosion engine having a variable compression ratio and comprising for each of the cylinders thereof an auxiliary piston provide with a piston rod movable in a cavity which is formed in the cylinder head and opens into the combustion chamber, wherein the cavity of the auxiliary piston defines with the auxiliary piston around said rod an annular chamber which is supplied with liquid under pressure by way of a check valve, the rod of the auxiliary piston comprising an axial bore in which is slidable a slide valve member the position of which is under the control of a parameter which represents the conditions of operation of the engine, said slide valve member being cooperative with at least one escape port provided across the hollow rod of the auxiliary piston so as to constitute a liquid discharge path for said chamber.

Preferably, the liquid under pressure is formed by the lubricating oil of the engine.

Two embodiments of the invention will be described in the ensuing description with reference to the accompanying drawings in which.

Figure 1:
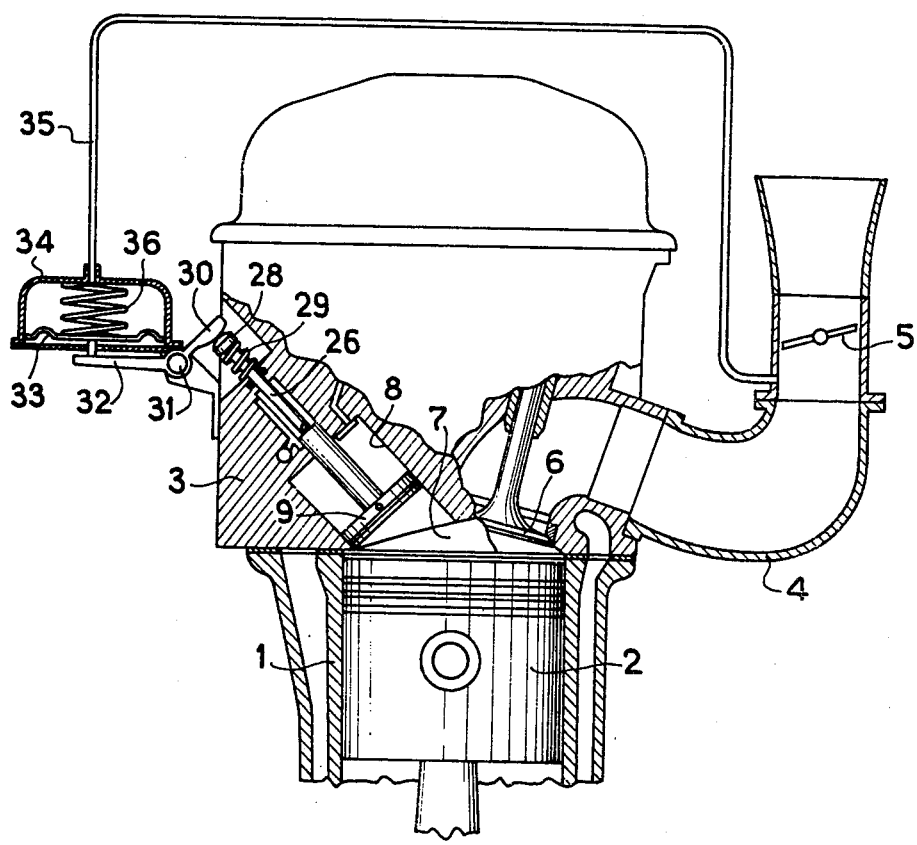
FIG. 1 is a partial sectional view of a cylinder of an explosion engine arranged in accordance with the invention.

With reference to FIG. 1, an explosion engine is represented by a cylinder 1, a piston 2, a cylinder head 3 and an induction pipe 4 with a fuel mixture throttle butterfly valve 5 and an induction pipe 6.

The piston 2, the cylinder 1 and the cylinder head 3 define a combustion chamber 7 whose volume is minimum when the piston 2 is in the upper dead center position (position shown in FIG. 1) and whose volume is maximum when the piston is in its lower dead center position. The ratio between these two volumes defines the compression ratio of the engine.

Formed in the cylinder head 3 is a cylindrical cavity 8 which opens into the combustion chamber 7 and in which is slidable an auxiliary piston 9 which permits modifying the volume of the combustion chamber.

Figure 2:
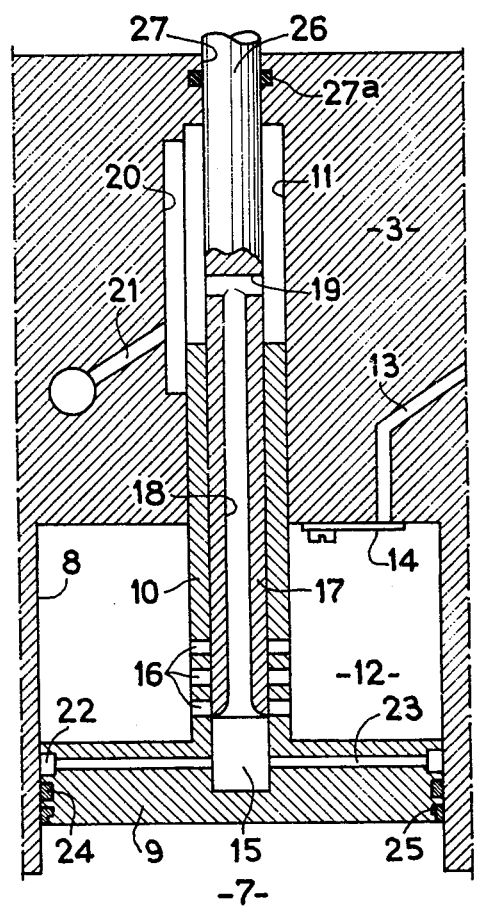
FIG. 2 is a view to an enlarged scale of a detail shown in FIG. 1.

As can be seen is more detail in FIG. 2, the auxiliary piston 9 comprised a rod 10 which is guided in a bore 11 in the cylinder head 3.

The cavity 8 defines with the auxiliary piston 2, around the rod 10, a chamber 12. A conduit 13 opens into the latter and supplies the lubricating oil of the engine under pressure. A check-valve 14 is placed at the outlet of the conduit 13 in the chamber 12.

The rod 10 of the auxiliary piston 9 has a central bore 15 which communicates with the chamber 12 by way of ports 16. A slide valve member 17 is slidable in the bore 15 and provided with a central passageway 18 which opens onto the lower end of the bore 15 and communicates by way of an aperture 19 with the part of the bore 11 which is located beyond the rod 10 of the auxiliary piston 9. This part of the bore 11 has a groove 20 from which leads a conduit 21 returning the liquid to the crankcase of the engine (not shown).

The auxiliary piston 9 has a groove 22 for recovering leakages and communicating with by way of a passageway 23 with the end of the bore 15. The piston 9 is also provided with sealing rings 24 and 25.

The slide valve member 17 is extended by a rod 26 which extends out of the cylinder head 3 by way of a bore 27 provided with a sealing ring 27a. The rod 26 terminates in a head 28 (FIG. 1) which a spring 29 biases away from the cylinder head 3.

A push-member 30 acts on the head 28 and is rigid with a shaft 31 which carries a lever 32 connected to the movable wall 33 of a depression box 34 whose chamber is connected by way of a conduit 35 to the induction pipe 4 downstream of the throttle 5. A spring 36 acts on the movable wall 33 in opposition to the action of the depression.

The device just described operates in the following manner:

When the absolute pressure in the combustion chamber 7 is lower than the pressure of the oil in the chamber 12, mainly during the induction stage, the auxiliary piston 9 moves toward the combustion chamber.

When the absolute pressure in the combustion chamber is higher than the pressure in the chamber 12, in particular at the end of the compression stage, the auxiliary piston 9 moves in the opposite direction. But this movement is stopped as soon as the ports 16 are closed off by the slide value member 17 owing to the incompressibility of the oil contained in the chamber 12.

Thus it can be seen that the minimum volume of the combustion chamber 7, which determines the volumetric compression ratio, depends on the position of the slide value member 17. This position depends on the value of the suction or depression in the induction pipe 4 and consequently on the load on the engine.

For low loads, to which high depressions correspond, the slide value member 17 is urged by the pushmember 30 inwardly of the bore 15 so that the auxiliary piston 9 is urged back toward this combustion chamber, the volume of which is therefore reduced and results in a high compression ratio.

On the other hand, for high loads, to which low depressions correspond, the auxiliary piston 9 is urged into its cavity 8, which increases the volume of the combustion chamber and therefore reduces the compression ratio.

This result is obtained by particularly simple means with no need for a special source of energy since the displacement of the slide valve member 17 occurs with negligible effort and the maintenance of the position of the auxiliary piston 9 involves no mechanical connection.

It is moreover of interest to mention that the continuous reciprocating movements of the auxiliary piston 9 eliminate any risk of a sticking of the latter and permit a permanent circulation of oil, which promotes cooling.

Figure 3:
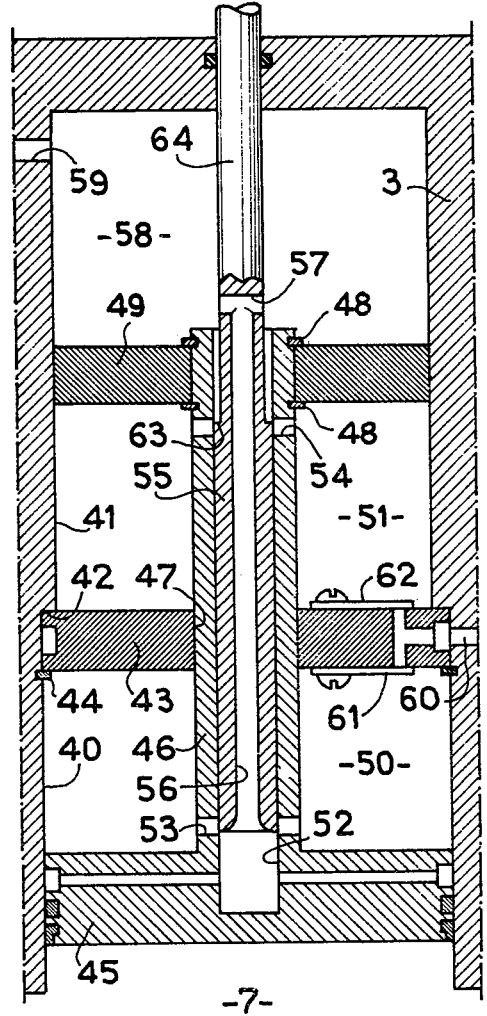
FIG. 3 is a view identical to FIG. 2 of a modification.

FIG. 3 shows another embodiment of the invention. In this embodiment, the cylinder head 3 has a cavity defined by two bores 40 and 41 separated by a shoulder 42. A partition wall 43 bears against this shoulder 42 and is held in position by a stop ring 44.

Slidable in the bore 40 is an auxiliary piston 45 which is extended by a rod 46 which extends through the partition wall 43 by way of a bore 47. Mounted at the end of the rod 46 between two stop rings 48 is a piston 49 which slides in the bore 41. The pistons 45 and 49 are therefore rigid with each other.

A chamber 50 is defined by the bore 40, the rod 46, the auxiliary piston 45 and the partition wall 43, and a chamber 51 is defined by the bore 41, the rod 46, the partition wall 43 and the piston 49.

The rod 46 of the auxiliary piston 45 comprises a center bore 52 which communicates with the chamber 50 by way of ports 53 and with the chamber 51 by way of ports 54.

Slidable in the bore 52 is a slide valve member 55 provided with a center passageway 56 which opens onto the end of the bore 52 and communicates by way of an aperture 57 with a chamber 58 defined at the end of the bore 41 by the piston 49.

The chamber 58 is connected to the engine crankcase (not shown) through a conduit 59.

A passageway 60 supplies the lubricating oil of the engine under pressure to the region of the partition wall 43 and, thence, to the chamber 50 by way of a check-valve 61 and to the chamber 51 by way of a check-valve 62.

The part of the slide valve member 55 which penetrates the chamber 58 has a reduced section starting at a shoulder 63 which defines the operative part of the slide valve member.

This operative part of the slide valve member may have a length slightly greater than the distance between the end edges of the ports 53 and 54 which may then be completely closed off at the same time.

The operative part of the slide valve member 55 may also have a length less than the distance between the end edges of the ports 53 and 54 which cannot be closed off at the same time.

The slide valve member 55 is extended out of the cylinder head 3 by a rod 64 which can be actuated as in the previously-described embodiment.

This device operates as before, except that the displacement of the auxiliary piston 45 toward the combustion chamber is limited by the closure of the port 54 since the reverse movement is limited by the closure of the ports 53. In this way, the freedom of movement of the piston 45 in the course of the operational cycle of the engine is controlled in a precise manner.

When the active part of the slide valve member 55 can completely close off both the ports 53 and 54, there is no movement of the auxiliary piston 45 as long as the slide valve member 55 is not displaced.

On the other hand, if the operative part of the slide valve member 55 cannot close off both the ports 53 and 54, a cyclic reciprocating movement of the piston 55 occurs which eliminates, as in the first embodiment, any risk of a sticking of the auxiliary piston.

It was assumed in the foregoing embodiments that the slide valve member 17 or 55 was controlled by a pneumatic means by the value of the depression in the induction pipe, but it will be understood that this slide valve member could be controlled by any other mechanical or hydraulic means and by a parameter representing the conditions of operation of the engine.

Having now described my invention what I claim as new and desire to secure by Letters Patent is:

1. A cylinder-type explosion engine having a variable compression ratio and comprising for each of the cylinders thereof, a cylinder head defining with the cylinder a combustion chamber, a cavity in the cylinder head and opening onto the combustion chamber, an auxiliary piston provided with a piston rod and movable in said cavity, the cavity defining with the auxiliary piston an annular chamber around said rod, a passageway communicating with said annular chamber for connection to a source of liquid under pressure, a check valve in said passageway, the rod of the auxiliary piston having a wall defining an axial bore therein, a slide valve member slidable in said bore, means for controlling the position of the slide valve member in said bore in accordance with a parameter which represents the conditions of operation of the engine, at least one throughway escape port in said wall defining the bore of the rod so as to constitute a liquid discharge path for said chamber, the slide valve member being cooperative with said escape port, a second cavity of smaller diameter than the cavity for the auxiliary piston and extending the cavity for the auxiliary piston, a second auxiliary piston fixed to a free end of the rod of the auxiliary piston and movable in said second cavity, said two cavities being defined by two bores, a shoulder between said two bores, a partition wall which is in bearing relation to said shoulder and separates said two cavities, said rod of the auxiliary piston extending through said partition wall, the auxiliary pistons and the partition wall defining with said cavities and the rod of the auxiliary piston two chambers escape ports in said rod of the auxiliary piston respectively putting the two chambers in communication with the bore of the rod of the auxiliary piston, the second auxiliary piston defining in said second cavity a chamber communicating with the fluid return conduit, an actuting rod extending the slide valve member and defining a shoulder which defines an operative portion of the slide valve member.

2. An engine as claimed in claim 1, wherein the operative portion of the slide valve member has a length slightly greater than the distance between end edges of the escape ports.

3. An engine as claimed in claim 1, wherein the operative portion of the slide valve member has a length less than the distance between end edges of the escape ports.

4. An engine as claimed in claim 1, comprising conduit means provided in the cylinder head and in said partition wall for supplying fluid under pressure to said two chambers, said conduit means communicating with both of said two chambers, and check-valves being disposed in said partition wall in facing relation to said conduit means communicating with said two chambers.

5. An engine as claimed in claim 1, wherein a return conduit is provided for connection to a source of fluid under pressure, said discharge path comprises, in addition to said escape port, an axial passageway in the slide valve member, said passageway communicating at one of its ends with the bore of the auxiliary piston rod and communicating at its other end with said return conduit, said passageway of said slide valve member communicating with said return conduit for returning the fluid to the source of fluid by way of said chamber defined by said second auxiliary piston and said second cavity.

* * * * *